(12) United States Patent
Young et al.

(10) Patent No.: US 7,549,596 B1
(45) Date of Patent: Jun. 23, 2009

(54) IMAGE BEARING SURFACE

(75) Inventors: Elizabeth Young, San Francisco, CA (US); Aaron Edelberg, San Francisco, CA (US); Mariko Nobori, Berkeley, CA (US); Bryan C. Bleil, San Ramon, CA (US)

(73) Assignee: Nvidia Corporation, Santa Clara, CA (US)

( * ) Notice: Subject to any disclaimer, the term of this patent is extended or adjusted under 35 U.S.C. 154(b) by 448 days.

(21) Appl. No.: 11/194,020

(22) Filed: Jul. 29, 2005

(51) Int. Cl.
G06K 19/06 (2006.01)
G09B 3/00 (2006.01)
G09B 7/00 (2006.01)

(52) U.S. Cl. .................. 235/494; 235/472.03; 434/322; 434/323

(58) Field of Classification Search .................. 235/494, 235/472.01, 491, 472.03; 434/322, 323
See application file for complete search history.

(56) References Cited

U.S. PATENT DOCUMENTS

| | | | |
|---|---|---|---|
| 6,502,756 B1 | 1/2003 | Fahraeus | |
| 6,966,495 B2 | 11/2005 | Lynggaard et al. | |
| 7,134,606 B2 * | 11/2006 | Chou | 235/494 |
| 2002/0120854 A1 * | 8/2002 | LeVine et al. | 713/189 |
| 2003/0162162 A1 * | 8/2003 | Marggraff | 434/410 |
| 2004/0121298 A1 * | 6/2004 | Creamer et al. | 434/322 |
| 2004/0202987 A1 * | 10/2004 | Scheuring et al. | 434/118 |
| 2004/0259067 A1 * | 12/2004 | Cody et al. | 434/323 |
| 2005/0002053 A1 * | 1/2005 | Meador et al. | 358/1.14 |
| 2005/0138541 A1 * | 6/2005 | Euchner et al. | 715/512 |

FOREIGN PATENT DOCUMENTS

| | | |
|---|---|---|
| WO | WO 00/73983 A1 | 12/2000 |
| WO | WO 01/01670 A1 | 1/2001 |
| WO | WO 01/16691 A1 | 3/2001 |
| WO | WO 01/26032 A1 | 4/2001 |
| WO | WO 01/71473 A1 | 9/2001 |
| WO | WO 01/71475 A1 | 9/2001 |
| WO | WO 01/75723 A1 | 10/2001 |
| WO | WO 01/75773 A1 | 10/2001 |
| WO | WO 01/75780 A1 | 10/2001 |
| WO | WO 01/95559 A1 | 12/2001 |

\* cited by examiner

*Primary Examiner*—Thien Minh Le
*Assistant Examiner*—Tuyen K Vo

(57) ABSTRACT

An image bearing surface. In accordance with a first embodiment of the present invention, an image bearing surface comprises a surface for interacting with a writing element of an electronic interactive device to embody a user created image thereon. The image bearing surface includes a first demarked region for accepting a plurality of user created images, each of the images representing a user response to a question, and a second demarked region for accepting a plurality of user created images identifying characteristics of the first demarked region to the electronic interactive device. The first and second demarked regions comprise a permanently printed encoded pattern of location information on the surface for providing location information to the electronic interactive device. The image bearing surface may be used to facilitate the use of supplementary educational testing materials.

9 Claims, 12 Drawing Sheets

500

The American Journey
1. The First Americans

Quiz Code: 965463    Quiz #1    Page 1 of 2

520

1. What is NOT a true statement about Anasazi cliff dwellings?
   A. easy to defend
   B. easy access to fishing
   C. protected from cold
   D. provided togetherness 2. What was the Mayan civilization which was ruled by religious law called?
   A. a democracy    C. mayonnaise
   B. a junta         D. a theocracy 3. In what Aztec capital did close to 200,000 people live in 1500 A.D.?
   A. Tenochtitlan    C. Mesa Verde
   B. Cuzco           D. couscous 4. Which happened first?
   A. Mexicans learned to farm
   B. Aztecs built empire
   C. Asians crossed land bridge into America
   D. Dances with Wolves filmed 5. The Aztecs had ceremonies in which they sacrificed their war prisoners to appease what god?
   A. emperor Pachacuti Inca Yupanqui
   B. the Hohokam people
   C. the sun god
   D. Darth Vader 6. Native Americans in eastern North America formed these to link their governments?
   A. senates         C. fences
   B. hunting parties  D. federations 7. What did the Hohokam dig to farm the hot, dry desert?
   A. deep mountain caves
   B. pyramid-shaped mounds
   C. irrigation channels
   D. a subway tunnel 8. What South American civilization was formed first?
   A. Aztec           C. Olmec
   B. Inca            D. Chili

510

530

HINTS
EE Clue: The Olmecs existed from around 1200 BC to 600 AD.
RR Ask yourself: What would plants need to grow in hot, dry desert?
XX Keep this in mind: It is believed that humans did not originate in the Americas
NN Remember: A theologian is an expert in the study of the nature of God.

GG Fact: The Anasazi were agriculturalists.
LL Fact: The Aztecs worshipped a multitude of gods.
ZZ Did you know: The states in our country federated to form one nation.
WW Did you know: The ancient capital of Cuzco is in Peru.

540

XXXXXXX
XXXXXXX
XXXXXXX
(repeated)

| The American Journey<br>1. The First Americans | Quiz Code<br>965463 | Quiz<br>#1 | Page<br>1 of 2 |

440

1. What is NOT a true statement about Anasazi cliff dwellings?
  A. easy to defend
  B. easy access to fishing
  C. protected from cold
  D. provided togetherness 2. What was the Mayan civilization which was ruled by religious law called?
  A. a democracy   C. mayonnaise
  B. a junta       D. a theocracy 3. In what Aztec capital did close to 200,000 people live in 1500 A.D.?
  A. Tenochtitlan  C. Mesa Verde
  B. Cuzco         D. couscous 4. Which happened first?
  A. Mexicans learned to farm
  B. Aztecs built empire
  C. Asians crossed land bridge into America
  D. Dances with Wolves filmed 5. The Aztecs had ceremonies in which they sacrificed their war prisoners to appease what god?
  A. emperor Pachacuti Inca Yupanqui
  B. the Hohokam people
  C. the sun god
  D. Darth Vader 6. Native Americans in eastern North America formed these to link their governments?
  A. senates       C. fences
  B. hunting parties  D. federations 7. What did the Hohokam dig to farm the hot, dry desert?
  A. deep mountain caves
  B. pyramid-shaped mounds
  C. irrigation channels
  D. a subway tunnel 8. What South American civilization was formed first?
  A. Aztec         C. Olmec
  B. Inca          D. Chili

500

HINTS
EE Clue: The Olmecs existed from around 1200 BC to 600 AD.
RR Ask yourself: What would plants need to grow in the hot, dry desert?
XX Keep this in mind: It is believed that humans did not originate in the Americas.
NN Remember: A theologian is an expert on the study of the nature of God.

GG Fact: The Anasazi were agriculturalists.
LL Fact: The Aztecs worshipped a multitude of up to
ZZ Did you know: The states in our country federated to form one nation.
WW Did you know: The ancient capital of Cuzco is in Peru.

|    | 1  | 2  | 3  | 4  | 5  | 6  | 7  | 8  | 9  | 10 | 11 | 12 | 13 | 14 | 15 | 16 |        |
|----|----|----|----|----|----|----|----|----|----|----|----|----|----|----|----|----|--------|
| 93 | D  | D  | A  | C  | A  | C  | B  | A  | A  | B  | B  | D  | B  | D  | B  | B  | Answer |
|    | JJ | QQ | EE | RR | WW | UU | ZZ | YY | MM | SS | GG | XX | HH | LL | NN | KK | Hint   |
| 94 | D  | C  | B  | A  | C  | C  | D  | A  | C  | B  | C  | D  | A  | A  | C  | D  | Answer |
|    | ZZ | MM | QQ | KK | WW | LL | RR | EE | JJ | UU | HH | GG | SS | YY | NN | XX | Hint   |
| 95 | D  | A  | D  | B  | B  | D  | C  | C  | B  | A  | B  | D  | C  | D  | A  | D  | Answer |
|    | RR | LL | UU | YY | KK | GG | ZZ | MM | XX | QQ | EE | WW | SS | JJ | NN | HH | Hint   |
| 96 | B  | D  | A  | C  | C  | D  | B  | B  | C  | D  | A  | B  | C  | A  | D  | A  | Answer |
|    | GG | NN | WW | XX | LL | ZZ | RR | EE | QQ | YY | MM | JJ | SS | HH | KK | UU | Hint   |
| 97 | A  | B  | A  | D  | C  | D  | C  | C  | C  | C  | A  | A  | A  | A  | B  | A  | Answer |
|    | NN | SS | JJ | KK | LL | WW | XX | RR | EE | HH | ZZ | MM | QQ | YY | GG | UU | Hint   |

IMAGE BEARING SURFACE

RELATED APPLICATIONS

This application is related to co-pending, commonly owned U.S. patent application Ser. No. 10/803,806, filed Mar. 17, 2004, to James Marggraff et al., entitled "SCANNING APPARATUS," which is hereby incorporated by reference herein in its entirety.

This application is related to co-pending, commonly owned U.S. patent application Ser. No. 10/861,243, filed Jun. 3, 2004, to James Marggraff et al., entitled "USER CREATED INTERACTIVE INTERFACE," which is hereby incorporated by reference herein in its entirety.

This application is related to co-pending, commonly owned U.S. patent application Ser. No. 11/034,491, filed Jan. 12, 2005, to James Marggraff et al., entitled "A METHOD AND SYSTEM FOR IMPLEMENTING A, USER INTERFACE FOR A DEVICE EMPLOYING WRITTEN GRAPHICAL ELEMENTS," which is hereby incorporated by reference herein in its entirety.

This application is related to co-pending, commonly owned U.S. patent application Ser. No. 11/035,155, filed Jan. 12, 2005, to James Marggraff et al., entitled "A METHOD AND SYSTEM FOR IMPLEMENTING A USER INTERFACE FOR A DEVICE THROUGH RECOGNIZED TEXT AND BOUNDED AREAS," which is hereby incorporated by reference herein in its entirety.

This application is related to co-pending, commonly owned U.S. patent application Ser. No. 11/035,003, filed Jan. 12, 2005, to James Marggraff et al., entitled "TERMINATION EVENTS," which is hereby incorporated by reference herein in its entirety.

This application is related to co-pending, commonly owned U.S. patent application Ser. No. 11/034,489, filed Jan. 12, 2005, by James Marggraff et al., entitled "PROVIDING A USER INTERFACE HAVING INTERACTIVE ELEMENTS ON A WRITABLE SURFACE," which is hereby incorporated by reference herein in its entirety.

This application is related to co-pending, commonly owned U.S. patent application Ser. No. 10/803,806, filed Mar. 17, 2004 to James Marggraff, entitled "A REUSABLE IMAGE BEARING SURFACE AND METHOD OF MODIFYING MEMORY CONTENTS RELATED TO SAME," which is hereby incorporated by reference herein in its entirety.

FIELD OF INVENTION

Embodiments of the present invention relate to the field of interactive devices and pen based computing. More specifically, embodiments of the present invention relate an image bearing surface and interactions with pen based computing.

BACKGROUND

In the last twenty years, the use of personal computing devices, such as desktop computer systems, laptop computer systems, handheld computers systems, and tablet computer systems, has grown tremendously. These personal computing devices provide users with a broad range of interactive applications, business utilities, communication abilities, and entertainment possibilities.

Current personal computing devices provide access to these interactive applications via a user interface. Typical computing devices have on-screen graphical interfaces that present information to a user using a display device, such as a monitor or display screen, and receive information from a user using an input device, such as a mouse, a keyboard, a joystick, or a stylus.

Even more so than computing systems, the use of pen and paper is ubiquitous among literate societies. While graphical user interfaces of current computing devices provide for effective interaction with many computing applications, typical on-screen graphical user interfaces have difficulty mimicking the common use of a pen or pencil and paper. For example, desktop and laptop computer systems typically do not have a pen-like interface. Moreover, input into a computer is shown on an electronic display, and is not tangible and accessible like information written on paper or a physical surface.

Finally, images and writings drawn with a pen-like interface on a paper surface have convenience, permanence, and tangibility.

Most literate societies place a high value on education, particularly the education of children. Commercial enterprises have developed uncountable products and services to assist in various forms of education. One large market is for supplemental learning materials. It is generally commercially impractical to store at a retail level, e.g., "on the shelves," a complete set of supplemental learning materials, e.g., practice tests, corresponding to all of the curricula materials in use in a store's geographic service area. For example, a particular subject area, e.g., American History, is generally divided into a number of lessons, for example, based on significant events, e.g., explorers, early settlers, pre-revolution, the revolution and the like. During such a course of study, it may be advantageous to test a student's knowledge at or near the completion of each such lesson.

Given a number of lessons per subject area, multiplied by a number of subject areas, multiplied by a number of grade levels, multiplied by a number of different text books in use within a school organization, multiplied by a number of school organizations in the geographic area, e.g., city, county, private, home schools and the like, the quantity of materials required to provide coverage of such lessons is generally quite large.

The World Wide Web or other electronic databases can provide access to electronic versions of such supplemental materials. As most tests are administered in a paper form, it is highly advantageous to practice taking tests in such a paper form. However, the conventional art is challenged to combine the advantages of a paper interface with timely feedback to the user, e.g., a student.

In a first conventional art method, a test is identified from a list of available tests by a user and the test is administered "on" a computer, e.g., via a web browser. This method can provide immediate feedback to the user as to the nature of an answer, e.g., if the answer is correct or incorrect. However, this method lacks the advantages of a paper interface. As an additional disadvantage of this method, the test must be taken at the computer, tying a student to the location of a computer and dedicating the resources of the computer to the student for the duration of the testing session.

In a second conventional art method, a test is identified from a list of available tests by a user and the test is printed by a computer-attached printer. This method can provide a high-quality image on paper. Further, the test can be administered away from the computer and at a later time. Unfortunately, the available feedback mechanisms for this method are disadvantageous. One feedback mechanism is to print an answer key with the test materials, e.g., upside down on the test. This mechanism provides ample opportunity for a user to be influenced, either intentionally or accidentally, by such an answer key prior to actually taking the test. A second feedback mechanism is to return to the web to access the answer key. This method suffers numerous temporal disadvantages.

SUMMARY OF THE INVENTION

Therefore, a need exists for an image bearing surface for interactive test taking. A need also exists for an image bearing surface having qualities of paper that also satisfies the above need. A further need exists for an image bearing surface that is compatible and complementary with existing computers, computer peripherals and methods of web access.

Accordingly, an image bearing surface is disclosed. In accordance with a first embodiment of the present invention, an image bearing surface comprises a surface for interacting with a writing element of an electronic interactive device to embody a user created image thereon. The image bearing surface includes a first demarked region for accepting a plurality of user created images, each of the images representing a user response to a question, and a second demarked region for accepting a plurality of user created images identifying characteristics of the first demarked region to the electronic interactive device. The first and second demarked regions comprise a permanently printed encoded pattern of location information on the surface for providing location information to the electronic interactive device.

In accordance with a method embodiment of the present invention, first markings on a surface are recognized responsive to a writing element creating the first markings. The surface comprises permanently printed encoded patterns of surface location information and the first markings comprise identifying characteristics of a plurality of questions printed on the surface. Second markings on the surface are recognized responsive to a writing element creating the second markings. Sound may be emitted responsive to the second markings.

BRIEF DESCRIPTION OF THE DRAWINGS

The accompanying drawings, which are incorporated in and form a part of this specification, illustrate embodiments of the invention and, together with the description, serve to explain the principles of the invention.

FIG. 5 illustrates an exemplary rendering of an image for printing on an image bearing surface, in accordance with embodiments of the present invention.

FIG. 6 illustrates an image of a rendering printed onto an image bearing surface, in accordance with embodiments of the present invention.

FIG. 7 illustrates an image of a quiz code written onto a second demarked region of an image bearing surface, in accordance with embodiments of the present invention.

FIG. 9A illustrates portions of an exemplary multiple choice answer lookup table data structure, in accordance with embodiments of the present invention.

FIG. 9B illustrates portions of an exemplary true/false answer lookup table data structure, in accordance with embodiments of the present invention.

DETAILED DESCRIPTION

Figure 1:
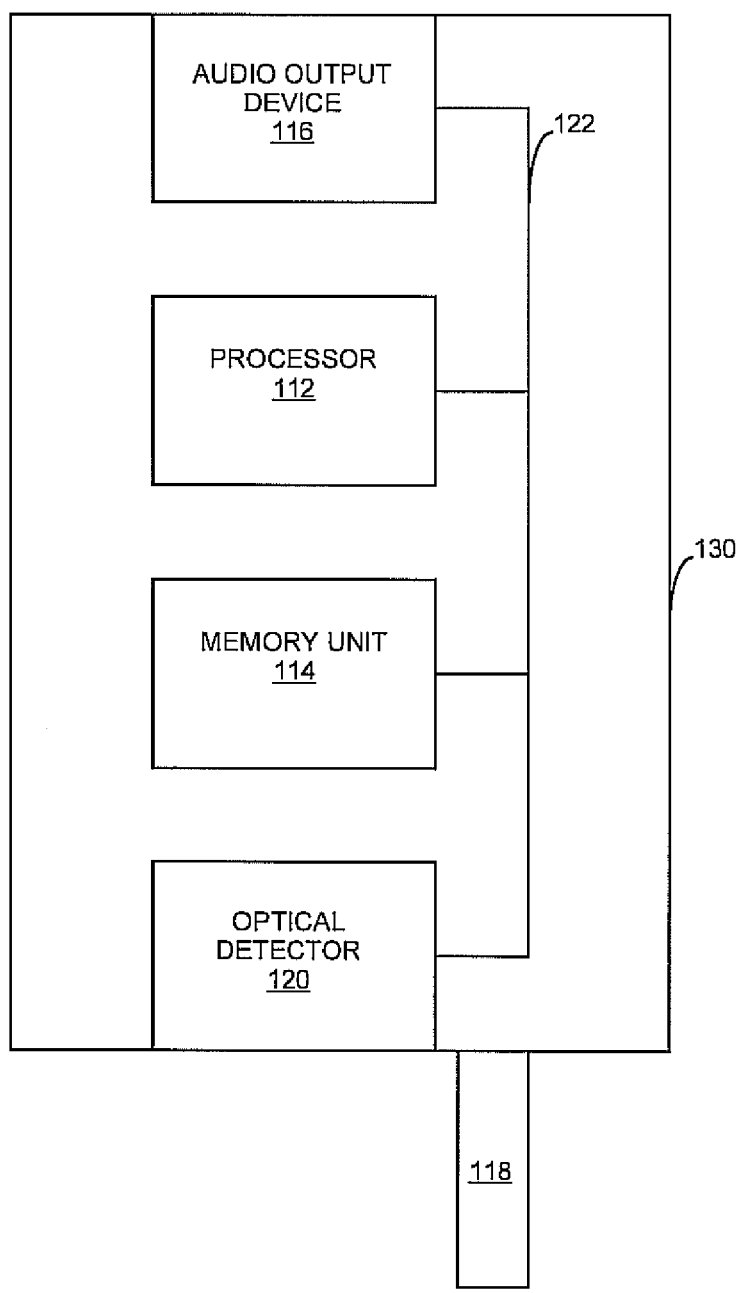
FIG. 1 illustrates an exemplary interactive device, in accordance with embodiments of the present invention.

Reference will now be made in detail to various embodiments of the invention, a reusable image bearing surface and method of modifying memory contents related to same, examples of which are illustrated in the accompanying drawings. While the invention will be described in conjunction with these embodiments, it is understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the invention, numerous specific details are set forth in order to provide a thorough understanding of the invention. However, it will be recognized by one of ordinary skill in the art that the invention may be practiced without these specific details. In other instances, well known methods, procedures, components, and circuits have not been described in detail as not to unnecessarily obscure aspects of the invention.

Some portions of the detailed descriptions, which follow, are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. It is appreciated that throughout the present invention, discussions utilizing terms such as "recognizing" or "emitting" or "erasing" or "modifying" or "recording" or "interfacing" or the like, often refer to the action and processes of an electronic system (e.g., interactive device 100 of FIG. 1), or similar electronic computing device, that manipulates and transforms data represented as physical (electronic) quantities within the electronic device's registers and memories into other data similarly represented as physical quantities within the electronic device memories or registers or other such information storage, transmission or display devices.

Image Bearing Surface

FIG. 1 illustrates an exemplary interactive device 100 for use with embodiments of the present invention, in accordance with embodiments of the present invention. The use, operation, and composition of interactive device 100 are described briefly herein, and more comprehensively in the above referenced patent applications which are incorporated by reference. Interactive device 100 includes processor 112, memory unit 114, audio output device 116, writing element 118 and optical detector 120 within housing 130. In one embodiment, processor 112, memory unit 114, audio output device 116 and optical detector 120 are communicatively coupled over bus 122. In one embodiment, optical detector 120 may also include an optical emitter. In one embodiment, housing 130 may also contain a power supply operable to power circuits and functions of interactive device 100. In one embodiment, housing 130 may also include a display and/or input buttons communicatively coupled with bus 122.

In one embodiment, housing 130 is shaped in the form of a stylus or a writing instrument (e.g., pen-like). In this embodiment, device 100 is a pen-based computer system. A user may hold interactive device 100 in a similar manner as a stylus is held. Writing element 118 is located at one end of housing 130 such that a user can place writing element 118 in contact with a writable surface (not shown). Writing element 118 may include a pen, a pencil, a marker, a crayon, chalk, or any other marking material. It should be appreciated that writing element 118 may also include a non-marking writing element such as a stylus type tip. It should also be appreciated that writing element 118 may also have magnetic properties. During use, a user can hold interactive device 100 and use it in a similar manner as a writing instrument to write on a surface with writing element 118.

Interactive device 100 allows users to create user-written selectable items that represent different functions provided by interactive device 100. In one embodiment, the user-written selectable item includes a symbol representation of an application program executable by processor 112. Computer code for recognizing such functional user-written selectable items and distinguishing them from other non-functional user-written items can reside in memory unit 114 in interactive device 100. It should be appreciated that interactive device 100 is also operable to recognize and execute functions associated with pre-printed selectable items on the surface.

Optical detector 120 is at one end of the stylus-shaped interactive device 100. Optical detector 120 is operable to detect information on a surface. In one embodiment, interactive device 100 also comprises an optical emitter for illuminating a portion of a surface that is detected by optical detector 120. The information detected by optical detector 120 is transmitted to processor 112.

Processor 112 may include any suitable electronics to implement the functions of the interactive device 100. Processor 112 can recognize the user-written selectable items and pre-printed selectable items, and can identify the locations of those user-written and pre-printed selectable items so that interactive device 100 can perform various operations. In these embodiments, memory unit 114 may comprise computer code for correlating any user-written or pre-printed selectable items with their locations on the surface.

Memory unit 114 comprises computer code for performing any of the functions of the interactive device 100. In one embodiment, wherein computer code stored in memory unit 114 and implemented on processor 112 is responsive to a user selection of a user-written or pre-printed selectable item and operable to execute a function associated with the user-written or pre-printed selectable item in response to the selection. Memory unit 114 is also operable to record information associated with user made markings on a surface.

Figure 2:
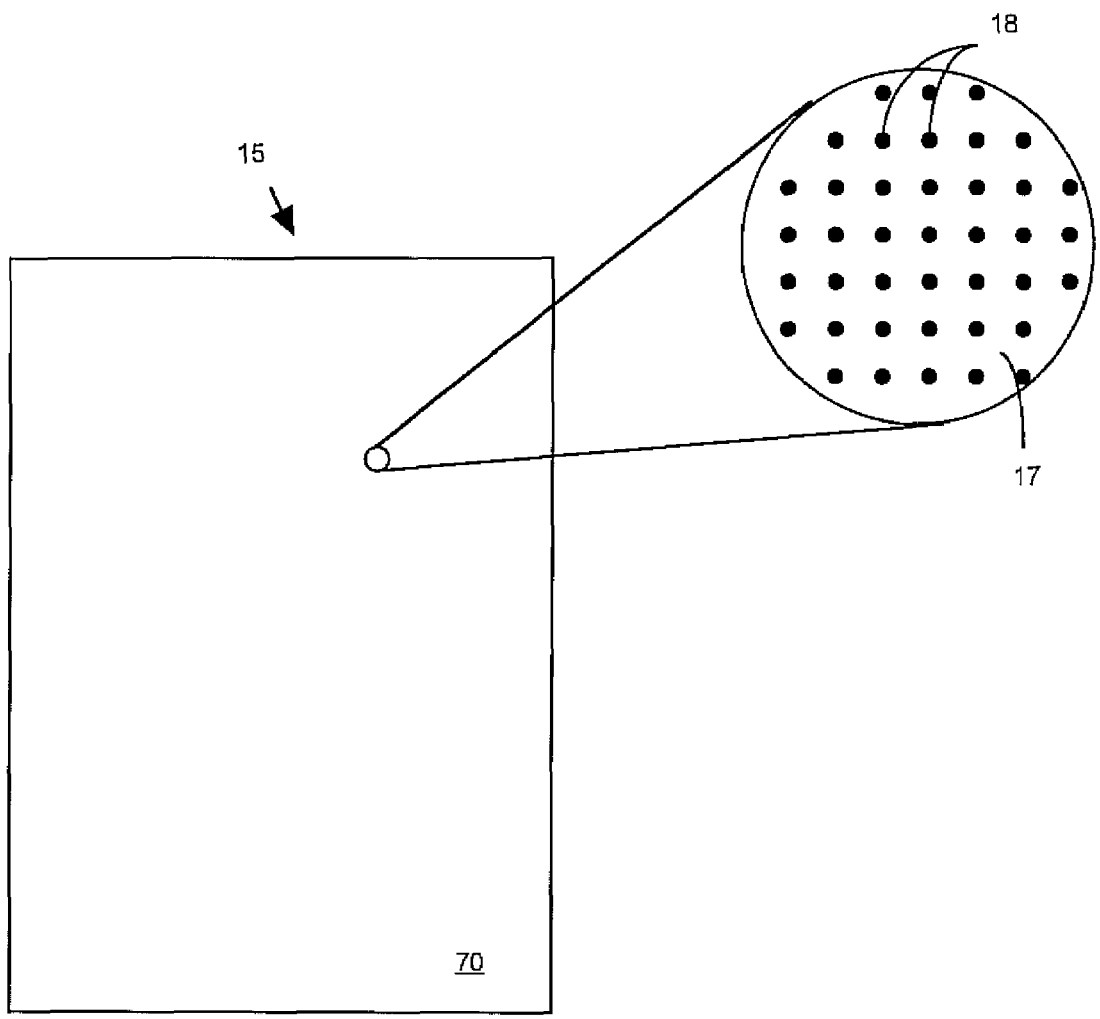
FIG. 2 shows an exemplary image bearing surface provided with a pattern of location determining marks, in accordance with embodiments of the present invention.

FIG. 2 shows an exemplary image bearing surface 15 provided with a pattern of location determining marks, in accordance with embodiments of the present invention. In the embodiment of FIG. 2, image bearing surface 15 is provided with a coding pattern in the form of optically readable position code 17 that consists of a pattern of marks 18. The marks 18 in FIG. 2 are greatly enlarged for the sake of clarity. In actuality, the marks 18 may not be easily discernible by the human visual system, and may appear as grayscale on reusable image bearing surface 15. In one embodiment, the marks 18 are embodied as dots; however, the present invention is not so limited. In one embodiment, the dots are permanently printed on the writing surface.

Figure 3:
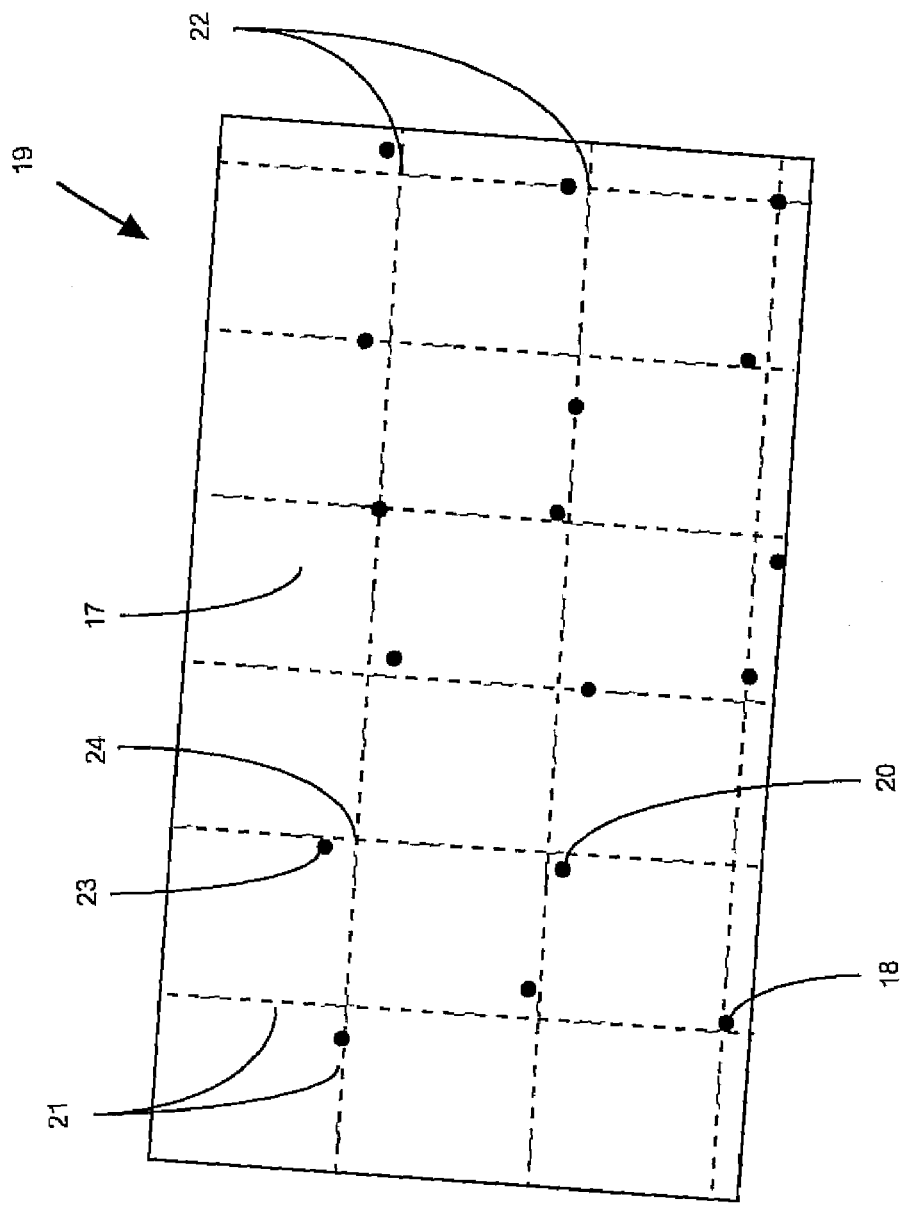
FIG. 3 shows an enlarged portion of the position code of FIG. 2, in accordance with embodiments of the present invention.

FIG. 3 shows an enlarged portion 19 of the position code 17 of FIG. 2, in accordance with embodiments of the present invention. An interactive device such as interactive device 100 (FIG. 1) is positioned to record an image of a region of the position code 17. In one embodiment, the optical device fits the marks 18 to a reference system in the form of a raster with raster lines 21 that intersect at raster points 22. Each of the marks 18 is associated with a raster point 22. For example, mark 23 is associated with raster point 24. For the marks in an image/raster, the displacement of a mark from the raster point associated with the mark is determined. Using these displacements, the pattern in the image/raster is compared to patterns in the reference system. Each pattern in the reference system is associated with a particular location on the reusable surface 70. Thus, by matching the pattern in the image/raster with a pattern in the reference system, the position of the pattern on the surface 70, and hence the position of the optical device relative to the surface 70, can be determined.

In one embodiment, the pattern of marks on image bearing surface 15 comprises substantially invisible codes. The codes are "substantially invisible" to the eye of the user and may correspond to the absolute or relative locations of the selectable items on the page. "Substantially invisible" also includes codes that are completely or slightly invisible to the user's eye. For example, if dot codes that are slightly invisible to the eye of a user are printed all over a sheet of paper, the sheet may appear to have a light gray shade when viewed at a normal viewing distance and/or without magnification. It should be appreciated that although dot patterned codes are specifically described herein, other types of substantially invisible codes may be used in other embodiments of the invention.

Anoto, a Swedish company, employs a technology that uses an algorithm to generate a pattern the enables a very large unique data space for non-conflicting use across a large set of documents. Their pattern, if fully printed, would cover 70 trillion 8.5"×11" pages with unique recognition of any 2 cm square on any page. Paper containing the specific dot patterns is commercially available from Anoto. The following patents and patent applications are assigned to Anoto and describe this basic technology and are all herein incorporated by reference in their entirety for all purposes: U.S. Pat. No. 6,502, 756, U.S. application Ser. No. 10/179,966, filed on Jun. 26, 2002, WO 01/95559, WO 01/71473, WO 01/75723, WO 01/26032, WO 01/75780, WO 01/01670, WO 01/75773, WO 01/71475, WO 00/73983, and WO 01/16691.

Figure 4:
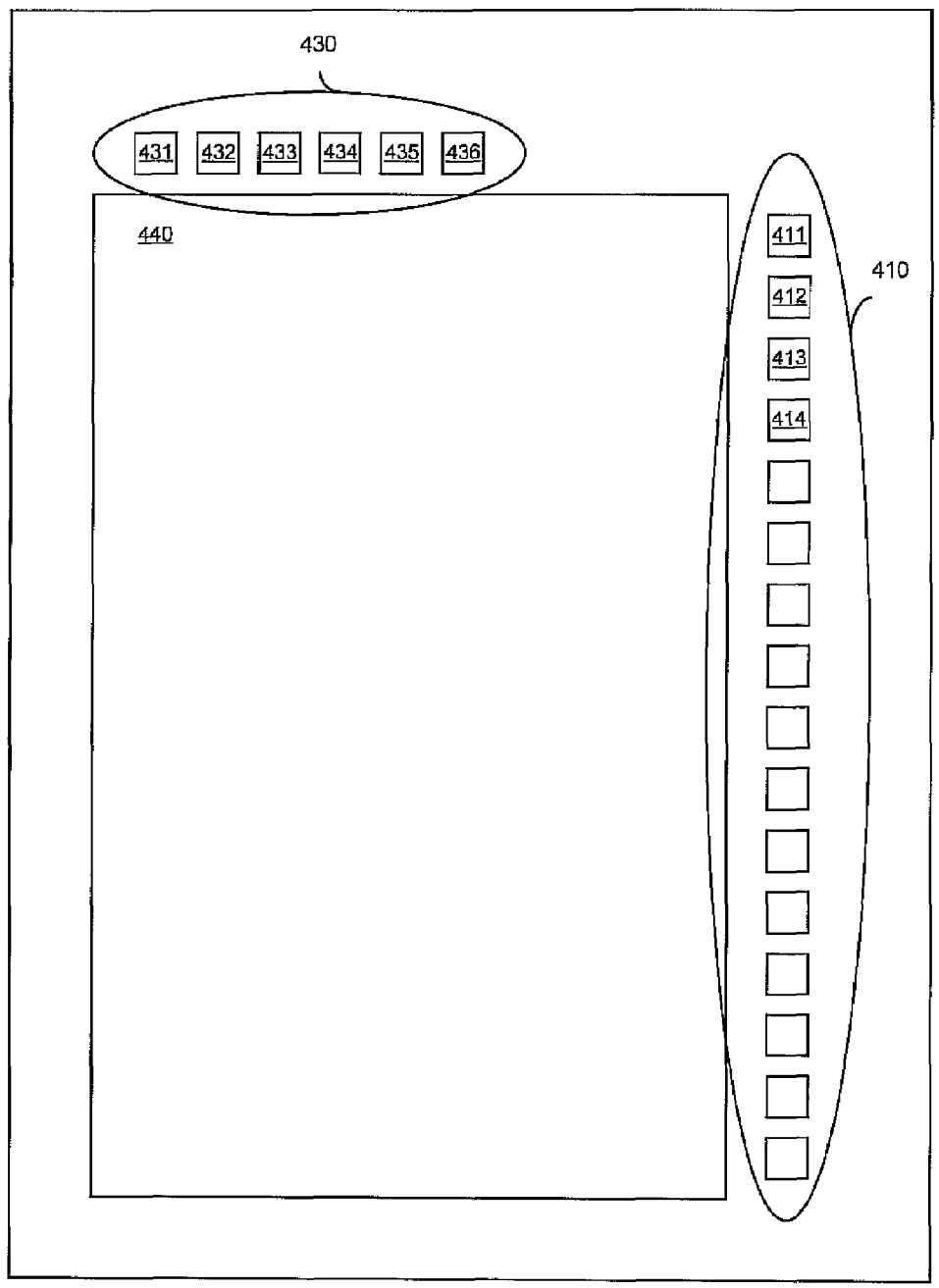
FIG. 4 shows an image bearing surface, in accordance with embodiments of the present invention.

FIG. 4 shows an image bearing surface, in accordance with embodiments of the present invention. In FIG. 4, the image bearing surface 400 is for making user generated markings and images with interactive device 100. Image bearing surface 400 comprises a permanently printed encoded pattern of the substantially invisible location codes (previously described), so that an electronic interactive device such as interactive device 100 is able to interact with reusable image bearing surface 400 and the user made images created on surface 400 by writing element 118. The permanently printed encoded pattern of substantially invisible location information also allows interactive device 100 to interact with any pre-printed items that may exist on or in association with an image bearing surface, such as surface 400.

In the embodiment of FIG. 4, image bearing surface 400 may be, for example, a piece of 8.5×11 inch paper preprinted with a plurality of images and a position code. It is to be appreciated that a position code need not be printed over the entirety of image bearing surface 400. Embodiments in accordance with the present invention are well suited to a variety of other paper sizes, e.g., 8.5×14 inches or A4 size paper, as well as to non-paper writing surfaces, e.g., "chalk" boards (liquid and traditional), electronic displays, hand held "slate"-like surfaces and the like.

Image bearing surface 400 comprises a first demarked region 410 for accepting a plurality of user created images. Each of the images may represent a user response to a question. In the embodiment of FIG. 4, first demarked region 410 comprises 16 sub regions or "answer boxes," e.g., sub regions 411-414, for accepting user created images responsive to a question.

Image bearing surface 400 further comprises a second demarked region 430 for accepting a plurality of user created images identifying characteristics of the first demarked region 410 to the electronic interactive device. In the embodiment of FIG. 4, second demarked region 430 comprises 6 sub regions 431-436 for accepting a numerical code hereinafter referred to as a "Quiz Code." It is to be appreciated that, in general, user created images should be made in second demarked region 430 prior to images created in first demarked region 410.

In accordance with embodiments of the present invention, the first 410 and second 430 demarked regions comprise a printed encoded pattern of location information on the surface for providing location information to the electronic interactive device, for example, instances of optically readable position code 17. The location information pattern is generally not easily erased. It is to be appreciated that the pattern of location information may be limited to individual sub regions of the first 410 and second 430 demarked regions, in accordance with embodiments of the present invention. For example, the pattern of location information may not be present in an area between sub regions 431 and 432.

Image bearing surface 400 may comprise a third demarked region 440. Region 440 may generally appear to be blank. For example, region 440 generally does not include human-viewable patterns, demarked areas or other identifiable features. Region 440 may or may not comprise a pattern of location information.

In one application of embodiments in accordance with the present invention, region 440 is disposed for receiving printing of a plurality of questions, e.g., a test or quiz. For example, an image stored in a computer usable media, e.g., a ".pdf" file, is printed onto image bearing surface 400. FIG. 5 illustrates an exemplary rendering 500 of such an image, in accordance with embodiments of the present invention.

Rendering 500 comprises a plurality of questions 510 and a Quiz Code 520. Rendering 500 may optionally comprise a plurality of hints 530 (shown printed upside down), an answer box obfuscation field 540 and/or a Quiz Code obfuscation field (not shown).

Most of rendering 500 is intended to fit within region 440 (FIG. 4). More particularly, questions 510, Quiz Code 520 and hints 530 generally are to be printed onto and within region 440.

Answer box obfuscation field 540 is generally rendered outside of region 440. More particularly, answer box obfuscation field 540 prints over answer boxes in region 410 in order to obscure answer boxes that are not utilized for this particular quiz page. For example, questions 510 comprise eight questions. Answer box obfuscation field 540 obscures answer boxes 9 through 16, instructing a user, e.g., a test taker, not to mark in those answer boxes.

In a similar manner, a Quiz Code obfuscation field (not shown) can print-over second demarked region 430 (FIG. 4) instructing a user, e.g., a test taker, not to mark in those Quiz Code boxes. A Quiz Code obfuscation field may be used for subsequent pages, e.g., pages other that a first page, of a test.

Figure 6:
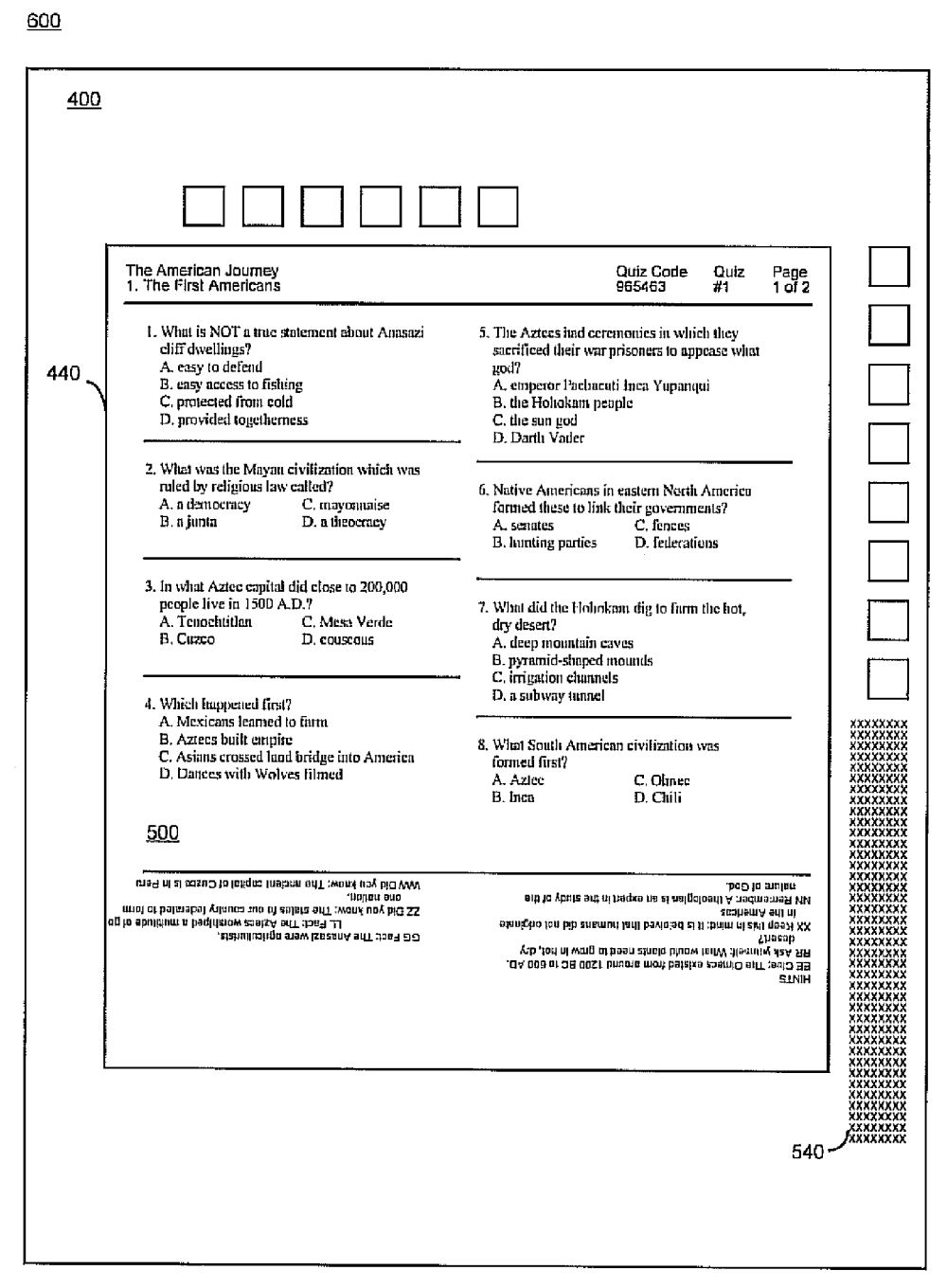

FIG. 6 illustrates an image 600 of rendering 500 printed onto image bearing surface 400, in accordance with embodiments of the present invention. It is to be appreciated that answer box obfuscation field 540 prints over answer boxes corresponding to answers 9 through 16.

A user initiates a test taking session by using an electronic interactive device, e.g., interactive device 100, to write Quiz Code 520 (FIG. 5) onto second demarked region 430, as shown in image 700 of FIG. 7, in accordance with embodiments of the present invention. Writing the symbols of Quiz Code 520 onto second demarked region 430 identifies the Quiz Code to the electronic interactive device.

In accordance with embodiments of the present invention, the Quiz Code identifies characteristics of the first demarked region 410 to the electronic interactive device. More particularly, the Quiz Code identifies a number of questions and corresponding answer boxes to be used in the test and the correct answer for each such answer box, in accordance with embodiments of the present invention.

Figure 8:
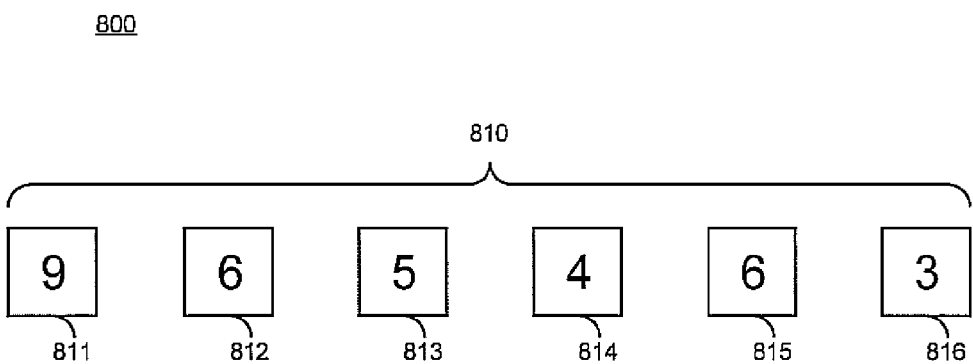
FIG. 8 illustrates an exemplary encoding of a quiz code, in accordance with embodiments of the present invention.

FIG. 8 illustrates an exemplary encoding 800 of a quiz code 810, in accordance with embodiments of the present invention.

Quiz code 810 comprises six symbols, 811 through 816. While symbols generally corresponding to Arabic numerals are illustrated herein, it is appreciated that embodiments in accordance with the present invention are well suited to virtually any set of symbols, for example, alpha-numeric characters of a variety of languages, pictograms, e.g., Kanji, and the like, and that such embodiments are considered within the scope of the present invention.

Symbols 811 and 812 identify a two-symbol multiple choice answer sheet template number. The template numbers range from 00-99, in accordance with one embodiment of the present invention. In accordance with embodiments of the present invention, a template number may be used as an index into a table stored in computer usable memory, e.g., in memory unit 114 of interactive device 100 (FIG. 1). The indexed table entry may provide a sequence of correct answers. In the present example, the answer sheet template number is 96.

Symbols 813 and 814 identify a two-symbol true/false template number. The template numbers range from 00-89, in accordance with one embodiment of the present invention. In accordance with embodiments of the present invention, a template number may be used as in index into a table stored in computer usable memory, e.g., in memory unit 114 of interactive device 100 (FIG. 1). The indexed table entry may provide a sequence of correct answers. In the present example, the true/false template number is 54.

Symbol 815 indicates a number of questions. This should range from 0-6, as there are a minimum of ten questions per test and a maximum of 16 questions per test, in accordance with one embodiment of the present invention. In the present example, the symbol "6" indicates that there are 16 questions in this test (questions 9-16 are not shown in the examples).

Symbol 816 indicates subject matter number of the test. For example, the symbol "1" can indicate a math test. The symbol "2" can indicate a science test. The symbol "3" can indicate a social studies test. In the present example, the subject matter is social studies.

FIG. 9A illustrates portions of an exemplary multiple choice answer lookup table data structure 900, in accordance with embodiments of the present invention. In accordance with embodiments of the present invention, multiple choice answer lookup table 900 is stored in computer usable memory, e.g., in memory unit 114 of interactive device 100 (FIG. 1). Multiple choice answer lookup table 900 comprises a plurality of rows, e.g., row 996.

As illustrated, the rows represent a particular answer template. Multiple choice answer lookup table 900 comprises 16 columns, e.g., column 901, indicating the correct answer to the corresponding 16 possible questions for a test. Multiple choice answer lookup table 900 further optionally comprises up to 16 hints corresponding to the 16 possible questions. Utilizing table 900 in conjunction with the previous exemplary quiz code yields the correct answer to question one as "B," located at the intersection of Row 996 and column 901.

Figure 9B:
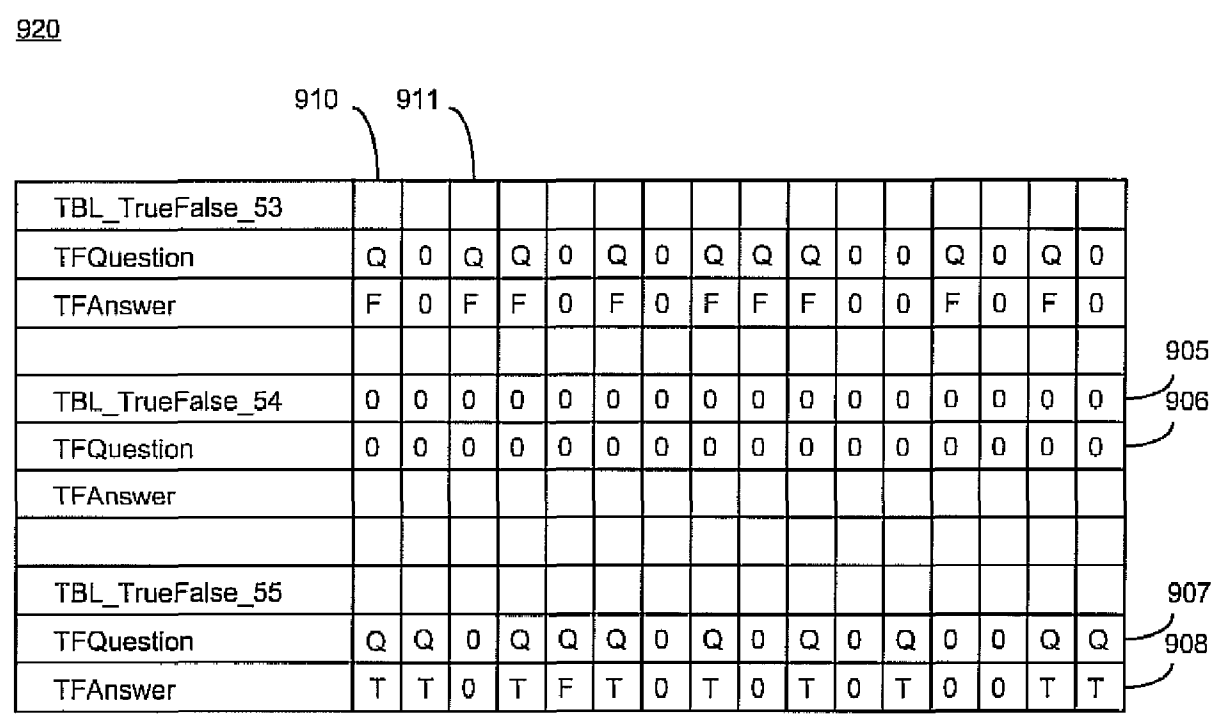

FIG. 9B illustrates portions of an exemplary true/false answer lookup table data structure 920, in accordance with embodiments of the present invention. In accordance with embodiments of the present invention, true/false answer lookup table 920 is stored in computer usable memory, e.g., in memory unit 114 of interactive device 100 (FIG. 1). True/false answer lookup table 920 comprises a plurality of rows, e.g., row 906.

As illustrated, the rows represent a particular answer template. True/false answer lookup table 920 comprises 16 columns, e.g., column 910, indicating the correct answer to the corresponding 16 possible questions for a test. True/false answer lookup table 920 further comprises an additional row per answer template. This row, e.g., row 905, indicates whether a particular question is a true/false question. In true/false answer lookup table 920, a "Q" in a "TFQuestion" row, e.g., row 905, indicates that a particular question is a true/false question. A zero indicates that a particular question is not a true/false question.

Utilizing table 920 in conjunction with the previous exemplary quiz code yields the correct answer to question one as "B," located at the intersection of Row 996 and column 901 (FIG. 9A). The intersection of row 905 and column 910 indicate that the question is not a true/false question.

Alternatively, had the quiz code been of the form xx55xx, e.g., symbols 813 and 814 (FIG. 8) identify a two-symbol true/false template number 55, then the correct answer would be "true." The table entry for true/false template number 55 indicates that question one is a true/false question (intersection of column 910 and row 907 is a "Q") and that the answer is "true" (intersection of column 910 and row 908 is a "T"). The table entry for true/false template number 55 further indicates that question three is a multiple choice question (intersection of column 911 and row 907 is a zero).

In this novel manner, both multiple choice and true/false questions can be combined in a single test. As an additional advantage, a relatively few answer templates, both multiple choice and true/false, may be combined to create a wide variety of available answer sequences. In general, it will be difficult for a user to associate an answer sequence with a quiz code.

Upon recognition of a Quiz Code by the electronic interactive device, the electronic interactive device is able to provide quick feedback to a user taking the test. For example, referring to the example of FIG. 6, responsive to a user writing the letter "B" in answer box 411, the interactive device can provide positive feedback indicating that "B" is the correct answer to question one. Similarly, the interactive device can provide feedback that any other response is incorrect.

Figure 10:
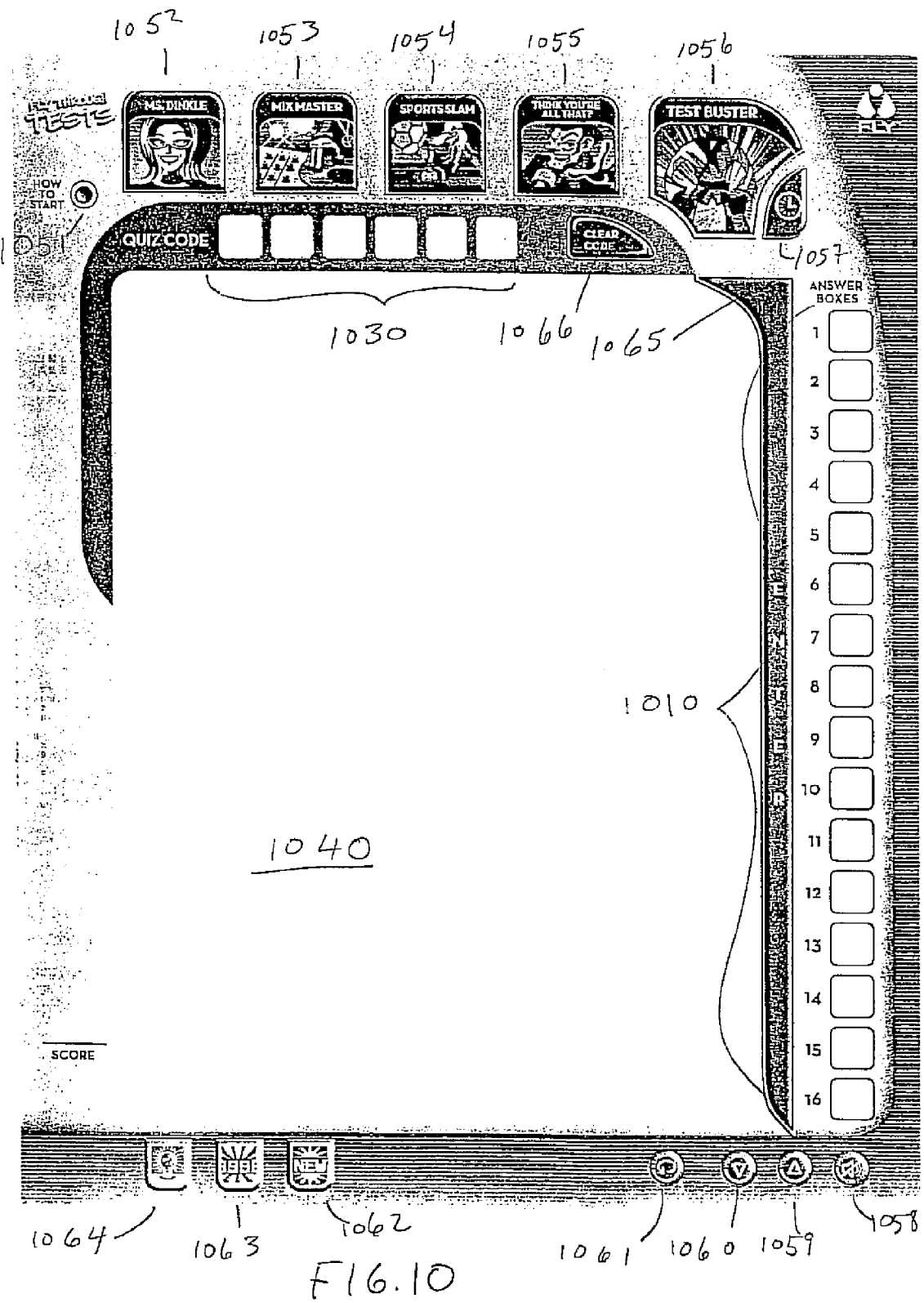
FIG. 10 illustrates an exemplary image bearing surface, in accordance with embodiments of the present invention.

FIG. 10 illustrates an exemplary image bearing surface 1000, in accordance with embodiments of the present invention. Image bearing surface 1000 comprises a first demarked region 1010, generally corresponding to first demarked region 410 of FIG. 4. Image bearing surface 1000 comprises a second demarked region 1030, generally corresponding to second demarked region 430 of FIG. 4. Image bearing surface 1000 comprises a third demarked region 1040, generally corresponding to third demarked region 440 of FIG. 4. In the embodiment of FIG. 10, substantially all of image bearing surface 1000 comprises a pattern of location information.

Image bearing surface 1000 comprises additional demarked areas. Responsive to touching the interactive device within demarked area 1051, the interactive device provides audible instructions on "how to start," for example, how to take a test. For example, exemplary instructions may be of the form, "enter the quiz code and then choose a game style."

Responsive to touching the interactive device within demarked area 1052, the interactive device adopts a "Ms. Dinkle" personality, e.g., the style of feedback from the device is consistent with a set of responses assigned to the character "Ms. Dinkle." For example, "Ms. Dinkle" responses may be primarily spoken, and generally kind and nurturing.

Responsive to touching the interactive device within demarked area 1053, the interactive device adopts a "Mix Master" personality, e.g., the style of feedback from the device is consistent with a set of responses assigned to the character "Mix Master." For example, "Mix Master" responses may be primarily musical, and generally edgy.

Responsive to touching the interactive device within demarked area 1054, the interactive device adopts a "Sports Slam" personality, e.g., the style of feedback from the device is consistent with a set of responses assigned to a sports announcer. For example, "Sports Slam" responses may be primarily spoken in an excited tone, and comprise numerous sports-related clichés. In accordance with alternative embodiments of the present invention, the "Sports Slam" personality may comprise "sub-personalities," for example, personalities oriented toward specific sports, e.g., soccer, basketball or professional wrestling.

Responsive to touching the interactive device within demarked area 1055, the interactive device adopts a "Think You're All That?" personality, e.g., the style of feedback from the device is consistent with a set of responses assigned to a very challenging personality. For example, "Think You're All That?" responses may be primarily spoken in an excited tone.

Responsive to touching the interactive device within demarked area 1056, the interactive device adopts a "Test Buster" personality, e.g., the style of feedback from the device is consistent with a set of responses assigned to a very professional test administrator. For example, "Test Buster" may provide no feedback during the test.

Responsive to touching the interactive device within demarked area 1057, the interactive device may start a clock, e.g., initiate a stopwatch function, to time the taking of the test.

Responsive to touching the interactive device within demarked area 1058, the interactive device may toggle a mute/unmute mode of the interactive device.

Responsive to touching the interactive device within demarked area 1059, the interactive device may increase the volume of its audible feedback. Responsive to touching the interactive device within demarked area 1060, the interactive device may decrease the volume of its audible feedback.

Responsive to touching the interactive device within demarked area 1061, the interactive device may repeat a previous operation, e.g., a previous feedback.

Responsive to touching the interactive device within demarked area 1062, the interactive device stops processing a current test and readies itself for processing a new test.

Responsive to touching the interactive device within demarked area 1063, the interactive device may report a list of high scores.

Responsive to touching the interactive device within demarked area 1064, the interactive device may provide a hint (if available) for a particular question. For example, see hints 530 of FIG. 5.

Responsive to touching the interactive device within demarked area 1065, the interactive device may accept an "enter" function. For example, in accordance with embodiments of the present invention, a user may mark an answer in the appropriate answer box. Touching the interactive device within demarked area 1065 will immediately "score" the answer, e.g., the interactive device provides audible feedback to the user. Alternatively, subsequent to a delay interval, e.g., a few seconds, after the marking, the interactive device automatically provides the feedback, without the user touching within the demarked area 1065.

Responsive to touching the interactive device within demarked area 1066, the interactive device may ignore or "clear" a quiz code, or portion thereof, previously marked in demarked area 1030.

Figure 11:
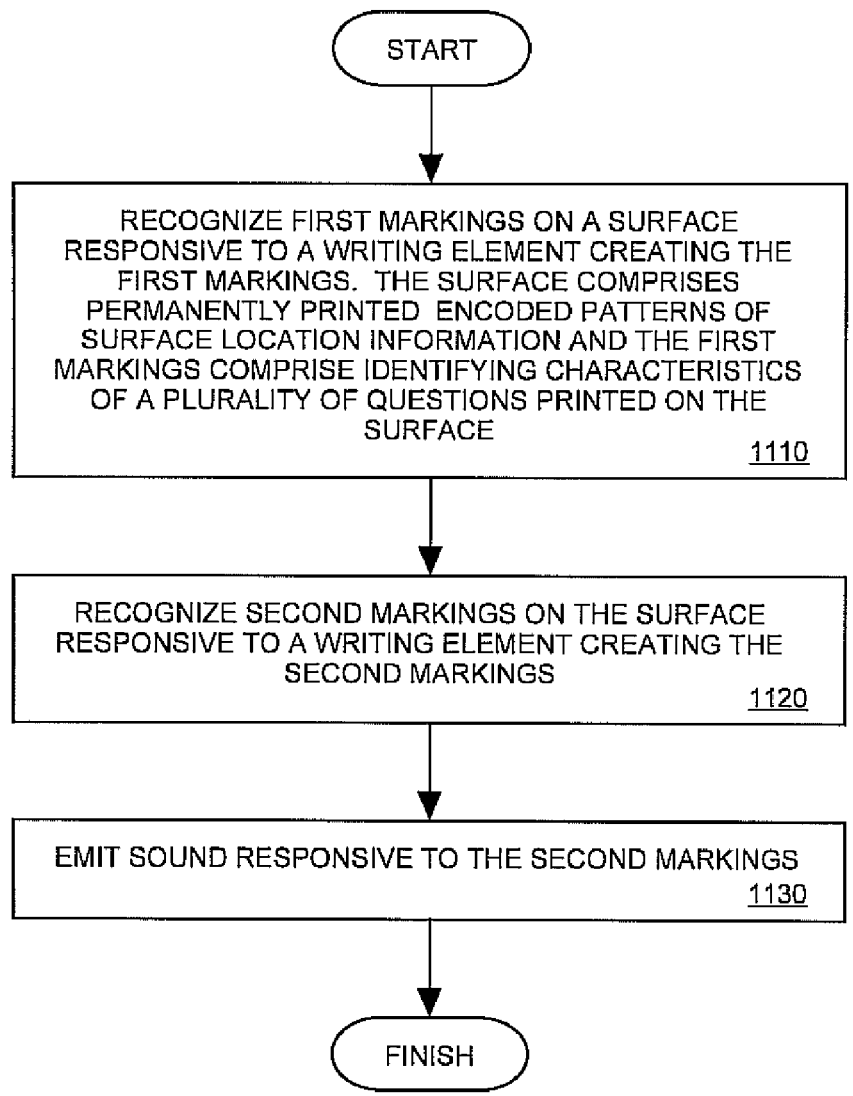
FIG. 11 illustrates a flow chart of a method in accordance with embodiments of the present invention.

FIG. 11 illustrates a flow chart of a method 1100, in accordance with embodiments of the present invention.

In 1110, first markings on a surface are recognized responsive to a writing element creating the first markings. The surface comprises permanently printed encoded patterns of surface location information and the first markings comprise identifying characteristics of a plurality of questions printed on the surface.

In 1120, second markings on the surface are recognized responsive to a writing element creating the second markings. In 1130, sound is emitted responsive to the second markings. The sound may be differentiated among correct and incorrect responses to one of the questions responded to by the second markings.

Embodiments in accordance with the present invention provide for an image bearing surface for interactive test taking. Additional embodiments provide for an image bearing surface having qualities of paper in addition to the aforementioned function. Further embodiments provide for an image bearing surface that is compatible and complementary with existing computers, computer peripherals and methods of web access.

Various embodiments of the invention, image bearing surface, are thus described. While the present invention has been described in particular embodiments, it should be appreciated that the invention should not be construed as limited by such embodiments, but rather construed according to the below claims.

What is claimed is:

1. An image bearing surface comprising:
   a surface for interacting with a writing element of an electronic interactive device to embody a user created image thereon;
   a first demarked region of said surface for accepting a first plurality of user created images, each of said first images representing a user response to a question;
   a second demarked region of said surface for accepting a second plurality of user created images, wherein said second plurality of user created images identify characteristics of said first demarked region to said electronic interactive device; and
   wherein said first and second demarked regions comprise an encoded pattern of location information printed on said surface for providing location information to said electronic interactive device.

2. The image bearing surface of claim 1 wherein said question is embodied on said image bearing surface.

3. The image bearing surface of claim 1 wherein said first demarked region is permanently printed.

4. The image bearing surface of claim 1 wherein said characteristics comprise a number of questions embodied on said surface.

5. The image bearing surface of claim 4 wherein said characteristics comprise a range of numbers corresponding to said questions embodied on said surface.

6. The image bearing surface of claim 1 wherein said characteristics comprise a type of said question.

7. The image bearing surface of claim 6 wherein said question is of the set comprising true/false and multiple choice questions.

8. The image bearing surface of claim 1 wherein said characteristics comprise a correct answer to said question.

9. The image bearing surface of claim 1 comprising a plurality of demarked regions that, when one of such regions is selected by said electronic interactive device, provides an instruction to said electronic interactive device for executing a function within said electronic interactive device.

\* \* \* \* \*

UNITED STATES PATENT AND TRADEMARK OFFICE
CERTIFICATE OF CORRECTION

PATENT NO. : 7,549,596 B1  Page 1 of 1
APPLICATION NO. : 11/194020
DATED : June 23, 2009
INVENTOR(S) : Elizabeth Young et al.

It is certified that error appears in the above-identified patent and that said Letters Patent is hereby corrected as shown below:

Title page, Item (73) Assignee should read

--LeapFrog Enterprises, Inc., Emeryville, CA (US)--

Signed and Sealed this

Twenty-third Day of November, 2010

David J. Kappos
*Director of the United States Patent and Trademark Office*